June 29, 1926.
W. L. SCRIBNER
1,590,861
DIFFERENTIATING MINE CAR AXLE
Filed April 1, 1926
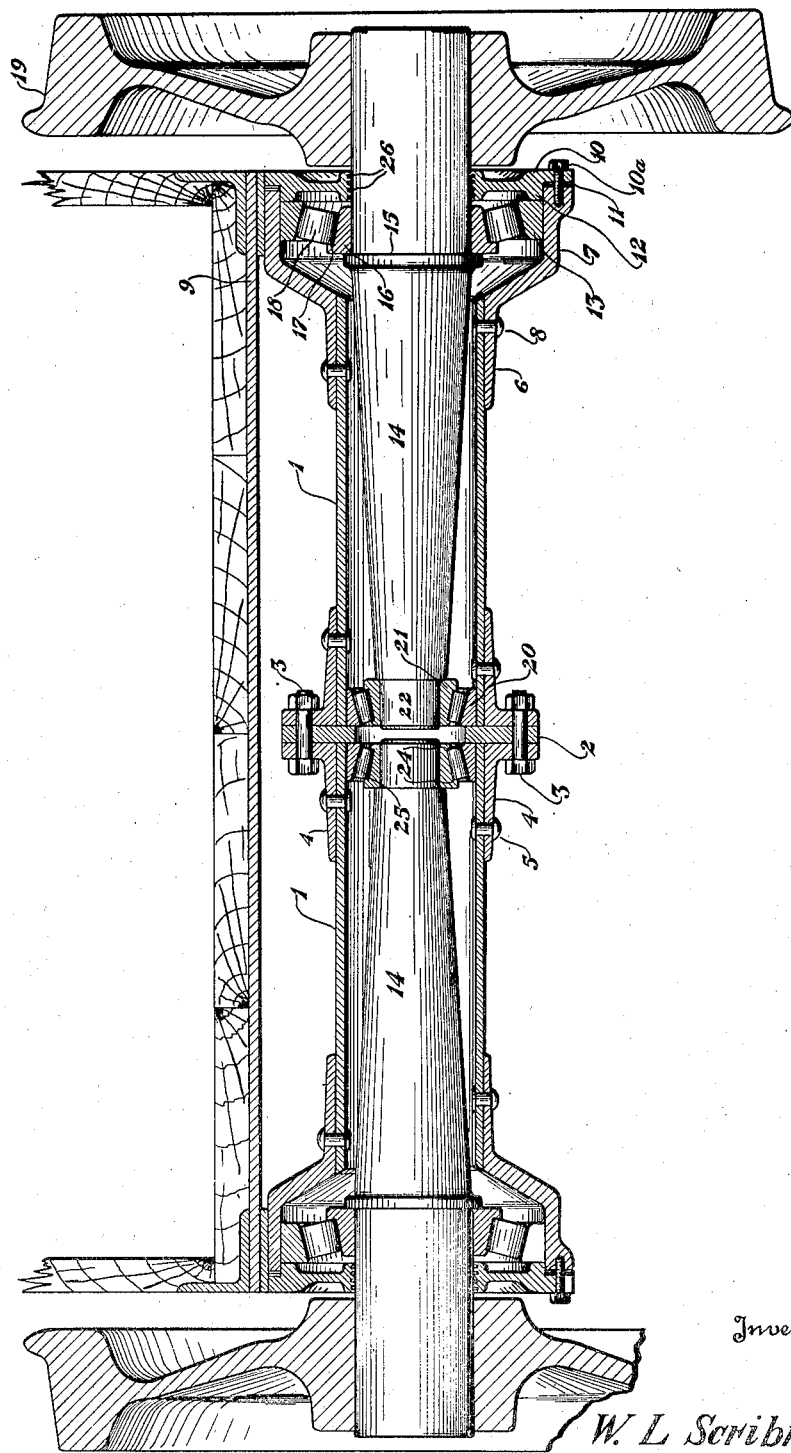
Inventor
W. L. Scribner
By Frank and Bond
Attorneys Patented June 29, 1926.

1,590,861

UNITED STATES PATENT OFFICE.

WILLIAM L. SCRIBNER, OF CANTON, OHIO, ASSIGNOR TO THE TIMKEN ROLLER BEARING COMPANY, OF CANTON, OHIO, A CORPORATION OF OHIO.

DIFFERENTIATING MINE-CAR AXLE.

Application filed April 1, 1926. Serial No. 99,060.

The invention relates to roller bearing axles, especially adapted for use upon mine cars and the like, and more particularly to a differentiating axle which permits the wheels to travel at different speeds, as when passing around a curve.

It is common practice, in the construction of mine cars, and the like, to fix a wheel upon each end portion of an axle; but such an arrangement does not permit of a differential speed in the travel of the wheels as the car passes around a curve, causing one wheel or the other to skid or slide upon the track.

To overcome this objection, cars of this type have been constructed in which each wheel is rotatably mounted upon the axle, but such a construction requires the use of two roller bearings for each wheel and necessitates the removal of the bearings with the wheels, complicating the construction thereof.

In my copending application, Serial No. 76,622, filed December 21, 1925, I disclose a differentiating axle in which only one roller bearing is used for each wheel, the axle being formed of two aligned, independently rotatable sections, to each of which one wheel is fixed; the adjacent ends of the axle sections being journaled in a central bearing sleeve carried within the axle housing.

The object of the present improvement is to provide a differentiating axle which will overcome the objections above referred to and which is an improvement upon the axle disclosed in my copending application above mentioned; the axle being formed in two aligned sections, independently rotatable, and having their adjacent ends journaled in roller bearings, mounted within the axle housing.

An embodiment of the invention is illustrated in the accompanying drawing, in which—

The figure is a longitudinal sectional view of an axle constructed in accordance with the invention.

Similar numerals refer to corresponding parts throughout the drawing.

The axle housing comprises two tubular sections 1, the adjacent ends of which are slightly separated by the ring 2 which extends across the adjacent ends of the housing sections being connected as by the bolts 3 to the flange rings 4 which are riveted or otherwise connected to the inner end portions of the housing sections as shown at 5.

A collar 6, provided with a cup flange 7, is riveted or otherwise connected to the outer end of each section of the axle housing as shown at 8, and connected in any suitable manner to the bottom or floor plate 9 of the car.

A ring 10 is connected, in any suitable manner, as by bolts 10$^a$ to the end of each cup flange, shim plates 11 being provided to properly space the same. This ring is provided with an annular flange 12 snugly fitting within the cup flange for contact with the cup 13 of a taper roller bearing.

The axle is formed of two aligned independently rotatable sections 14, each of which is provided with an annular shoulder 15 arranged to be located within the cup flange and contacting with the inner end of the cone 16 of said taper roller bearing, said cone being provided at its inner end portion with an annular shoulder 17 for engagement with the adjacent ends of the taper rollers 18. Each car wheel 19 is fixed, in any suitable manner upon the outer end portion of the adjacent axle section.

The cup 20 of a taper roller bearing is mounted within the inner end portion of each housing section and in engagement with the central ring 2 and the cone 21 of each of these roller bearings is carried upon the reduced inner end portion 22 of the adjacent axle section 14 and in engagement with the annular shoulder 23 of the axle section. Each of these cones may be provided with the peripheral shoulders 24 for receiving the end thrust of the taper rollers 25.

The interior of the axle housing is preferably filled with grease and to prevent the same from leaking around the wheel hub, washers 26 of leather or the like may be carried by the ring 10 and arranged to contact with the axle.

Each wheel is thus fixed upon one independently rotatable section of the axle, the axle sections being journaled, near each end, by means of the taper roller bearings, within the axle housing.

Thus a differentiating axle is provided in which each wheel is independently rotatable and carried by an independent axle section journaled at opposite ends in taper roller bearings which take the entire thrust in both directions as well as the radial load.

The roller bearings may be adjusted to take up wear by tightening the adjusting bolts in the rings, drawing these rings against the cups of the outer bearings, the proper thickness of shim plates being of course placed in position between the rings and the ends of the axle housing.

I claim:

1. A differentiating axle including an axle housing formed of two tubular sections having peripheral flanges at their inner ends, a ring connected to said flanges and extending into the middle portion of the housing, an antifriction bearing within each housing section and contacting with said ring, a pair of aligned axle sections within the housing having their inner ends journaled in said antifriction bearings, the outer end portion of each axle section being shouldered, a roller bearing cone upon the shouldered portion of each axle section, a roller bearing cup mounted in each outer end portion of the housing, taper rollers between each cooperating cone and cup, and a wheel fixed upon the outer end portion of each axle section.

2. A differentiating axle including an axle housing formed of two tubular sections having peripheral flanges at their inner ends, a ring connected to said flanges and extending into the middle portion of the housing, an antifriction bearing within each housing section and contacting with said ring, a pair of aligned axle sections within the housing having their inner ends reduced and journaled in said antifriction bearings, the outer end portion of each axle section being shouldered, a roller bearing cone upon the shouldered portion of each axle section, a roller bearing cup mounted in each outer end portion of the housing, taper rollers between each cooperating cone and cup, and a wheel fixed upon the outer end portion of each axle section.

3. A differentiating axle including a tubular axle housing, antifriction bearings within the central portion of the axle housing, a pair of aligned axle sections within the housing having their inner ends shouldred and journaled in said antifriction bearings, the outer end portion of each axle being shouldered, a roller bearing cone upon the shouldered portion of each axle section, a roller bearing cup mounted in each outer end portion of the housing, taper rollers between each cooperating cone and cup, and a wheel fixed upon the outer end portion of each axle section.

4. A differentiating axle including a tubular axle housing, antifriction bearings within the central portion of the axle housing, a pair of aligned axle sections within the housing having their inner ends shouldered and journaled in said antifriction bearings, the outer end portion of each axle being shouldered, a roller bearing cone upon the shouldered portion of each axle section, a roller bearing cup mounted in each outer end portion of the housing, taper rollers between each cooperating cone and cup, a wheel fixed upon the outer end portion of each axle section, a ring in each outer end portion of the axle housing contacting with said roller bearing cup and means for adjusting said ring within the housing.

In testimony that I claim the above, I have hereunto subscribed my name.

WILLIAM L. SCRIBNER.